US012605769B2

(12) United States Patent (10) Patent No.: US 12,605,769 B2
Nanahara et al. (45) Date of Patent: Apr. 21, 2026

(54) INSERT AND CUTTING TOOL

(71) Applicant: KYOCERA CORPORATION, Kyoto (JP)

(72) Inventors: Hiroyuki Nanahara, Satsumasendai (JP); Futoshi Isobe, Satsumasendai (JP); Yusuke Nagaoka, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 721 days.

(21) Appl. No.: 18/002,864

(22) PCT Filed: Jun. 23, 2021

(86) PCT No.: PCT/JP2021/023819
§ 371 (c)(1),
(2) Date: Dec. 22, 2022

(87) PCT Pub. No.: WO2022/004527
PCT Pub. Date: Jan. 6, 2022

(65) Prior Publication Data
US 2023/0249260 A1 Aug. 10, 2023

(30) Foreign Application Priority Data
Jun. 30, 2020 (JP) ................................ 2020-113043

(51) Int. Cl.
*B23B 27/14* (2006.01)
*C04B 35/58* (2006.01)
(Continued)

(52) U.S. Cl.
CPC ........ *B23B 27/14* (2013.01); *C04B 35/58014* (2013.01); *C04B 35/5831* (2013.01); *C04B 41/81* (2013.01); *C04B 2235/3813* (2013.01); *C04B 2235/386* (2013.01); *C04B 2235/3886* (2013.01); *C04B 2235/402* (2013.01); *C04B 2235/762* (2013.01); *C04B 2235/94* (2013.01)

(58) Field of Classification Search
CPC ................ B23B 27/14; C04B 35/5831; C04B 2235/386; C04B 2235/402; C04B 2235/3865; B22F 2005/001
See application file for complete search history.

(56) References Cited

U.S. PATENT DOCUMENTS

2007/0099030 A1* 5/2007 Dahl ................... C04B 35/5831
428/698
2008/0264203 A1 10/2008 Dahl et al.
2016/0236988 A1 8/2016 Kobayashi

FOREIGN PATENT DOCUMENTS

CN 100567211 C 12/2009
JP 2007144615 A 6/2007
(Continued)

*Primary Examiner* — Amber R Orlando
*Assistant Examiner* — Cameron K Miller
(74) *Attorney, Agent, or Firm* — HAUPTMAN HAM, LLP

(57) ABSTRACT
An insert of the present disclosure includes a cBN sintered compact containing cBN and TiN. The cBN occupies 60% or more of the cross-sectional area of the cBN sintered compact observed. TiN (200) is higher than cBN (111), where the TiN (200) is an X-ray intensity on a (200) plane of the TiN and the cBN (111) is an X-ray intensity on a (111) plane of the cBN, obtained by X-ray diffraction on the cBN sintered compact.

8 Claims, 7 Drawing Sheets

(51) Int. Cl.
*C04B 35/5831* (2006.01)
*C04B 41/81* (2006.01)

(56) References Cited

FOREIGN PATENT DOCUMENTS

| JP | 2008272929 A | 11/2008 |
|----|-------------|---------|
| JP | 201714084 A | 1/2017 |
| JP | 2019172477 A | 10/2019 |
| WO | 2015060320 A1 | 4/2015 |
| WO | 2017006777 A1 | 1/2017 |

* cited by examiner

100

3

1

75

73

70

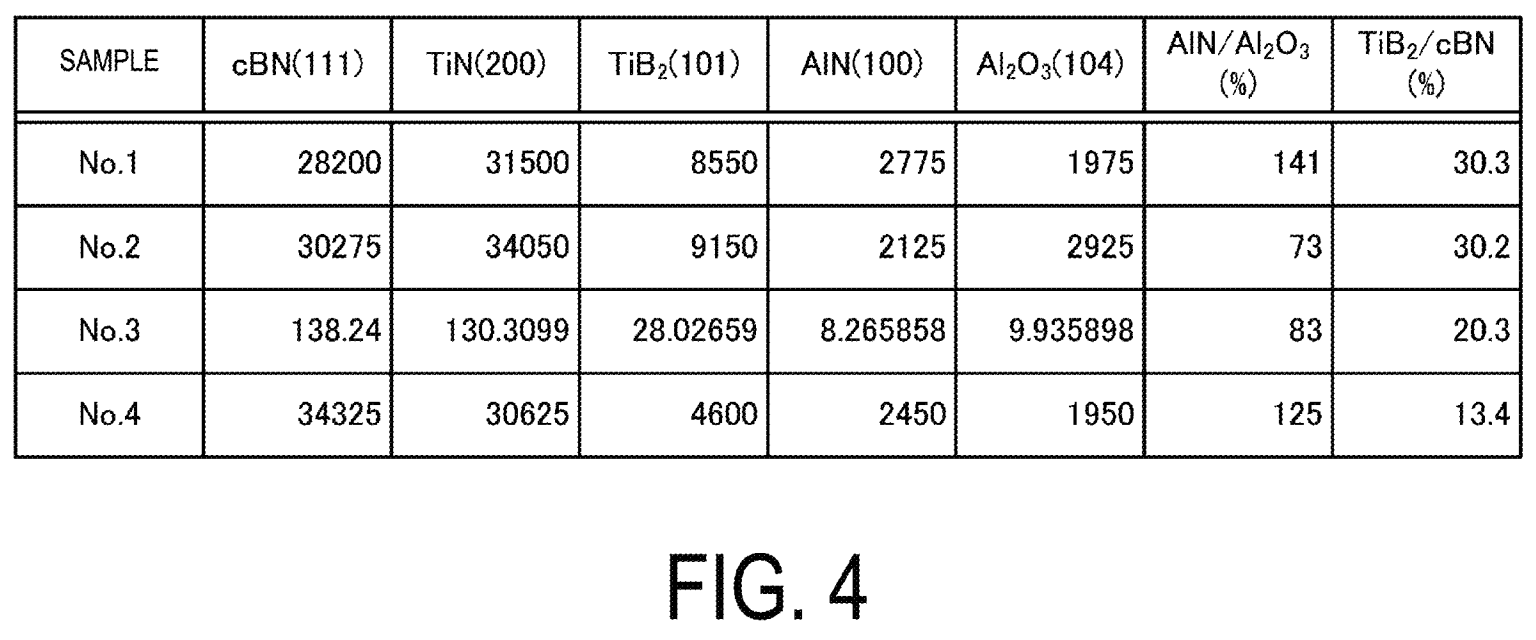

| SAMPLE | cBN(111) | TiN(200) | TiB₂(101) | AlN(100) | Al₂O₃(104) | AlN/Al₂O₃ (%) | TiB₂/cBN (%) |
|---|---|---|---|---|---|---|---|
| No.1 | 28200 | 31500 | 8550 | 2775 | 1975 | 141 | 30.3 |
| No.2 | 30275 | 34050 | 9150 | 2125 | 2925 | 73 | 30.2 |
| No.3 | 138.24 | 130.3099 | 28.02659 | 8.265858 | 9.935898 | 83 | 20.3 |
| No.4 | 34325 | 30625 | 4600 | 2450 | 1950 | 125 | 13.4 |

FIG. 4

| SAMPLE | WEAR RESISTANCE EVALUATION (MIN) | STABILITY EVALUATION (TIMES) |
|---|---|---|
| No.1 | 38.6 | 25300 |
| No.2 | 35 | 21500 |
| No.3 | 30.8 | 19100 |
| No.4 | 23.1 | 4800 |

FIG. 7

INSERT AND CUTTING TOOL

RELATED APPLICATIONS

The present application is a National Phase of International Application Number PCT/JP2021/023819 filed Jun. 23, 2021, and claims priority of Japanese Application Number 2020-113043 filed Jun. 30, 2020.

TECHNICAL FIELD

The present disclosure relates to an insert and a cutting tool.

BACKGROUND OF INVENTION

Cubic boron nitride (cBN) is harder than anything other than diamond, and features excellent chemical stability. Therefore, a cBN sintered compact has been widely used as a cutting tool for processing ferrous metal such as hardened steel, cast iron, and sintered alloy.

CITATION LIST

Patent Literature

Patent Document 1: JP 2019-172477 A

SUMMARY

An insert according to an aspect of the present disclosure includes a cBN sintered compact containing cBN and TiN. The cBN occupies 60% or more of the cross-sectional area of the cBN sintered compact observed. TiN (200) is higher than cBN (111), where the TiN (200) is an X-ray intensity on a (200) plane of the TiN and the cBN (111) is an X-ray intensity on a (111) plane of the cBN, obtained by X-ray diffraction on the cBN sintered compact.

BRIEF DESCRIPTION OF THE DRAWINGS

FIG. 4 is a table illustrating a result of expressing the peak intensity height obtained by XRD measurement using the number of counts of a scintillation counter per second.

FIG. 7 is a table illustrating the results of evaluating wear resistance and stability for each sample.

DESCRIPTION OF EMBODIMENTS

The following is a detailed description of an insert and a cutting tool according to the present disclosure (hereinafter referred to as "embodiments") with reference to the drawings. It should be noted that the insert and the cutting tool according to the present disclosure are not limited by the embodiments. In addition, embodiments can be appropriately combined so as not to contradict each other in terms of content. In the following embodiments, the same portions are denoted by the same reference signs, and overlapping explanations are omitted.

In the embodiments described below, expressions such as "constant", "orthogonal", "vertical", and "parallel" may be used, but these expressions do not need to be exactly "constant", "orthogonal", "vertical", and "parallel". In other words, each of the above-described expressions allows for deviations in, for example, manufacturing accuracy, positioning accuracy, and the like.

The present disclosure provides a technique with which fracture resistance of an insert including a cBN sintered compact can be improved.

Insert

Figure 1:
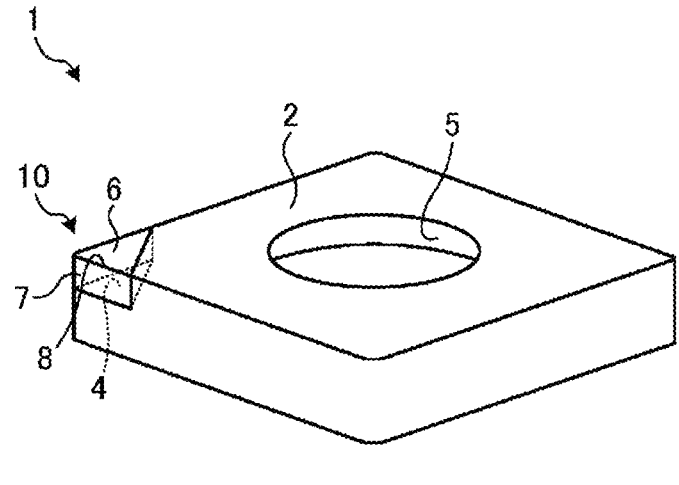
FIG. 1 is a perspective view illustrating an example of an insert according to an embodiment.

FIG. 1 is a perspective view illustrating an example of an insert according to an embodiment. As illustrated in FIG. 1, the insert 1 according to the embodiment is an insert for a cutting tool and has a hexahedral shape in which a shape of an upper surface and a lower surface (a surface intersecting the Z-axis illustrated in FIG. 1) is a parallelogram, for example.

The insert 1 according to the embodiment includes a body portion 2 and a base 10 attached to the body portion 2 via a bonding material 40 described later (see FIG. 2).

The body portion 2 is formed of, for example, cemented carbide. The cemented carbide contains tungsten (W), specifically, tungsten carbide (WC). Further, the cemented carbide may contain nickel (Ni) or cobalt (Co). Alternatively, the body portion 2 may be formed of a cermet. The cermet contains, for example, titanium (Ti), specifically, titanium carbide (TiC) or titanium nitride (TiN). Furthermore, the cermet may contain Ni or Co.

A seat 4 for attaching the base 10 is located in an end portion of the body portion 2. A through hole 5 that vertically penetrates the body portion 2 is located in the center portion of the body portion 2. A screw 75 for attaching the insert 1 to a holder 70 described later is inserted into the through hole 5 (see FIG. 3).

The base 10 is attached to the seat 4 of the body portion 2. As a result, the base 10 is integrated with the body portion 2.

The base 10 has a first surface 6 (here, an upper surface) and a second surface 7 (here, a side surface) that is connected to the first surface 6. In the embodiment, the first surface 6 functions as a "rake face" for scooping chips generated by cutting, and the second surface 7 functions as a "flank face". A cutting edge 8 is located on at least a part of a ridge line where the first surface 6 and the second surface 7 intersect with each other, and the insert 1 cuts a workpiece through application of the cutting edge 8 against the workpiece.

The base 10 is a cubic boron nitride (cBN) sintered compact (hereinafter referred to as "cBN sintered compact"), in which a plurality of cBN particles is bound via a binder phase. The specific configuration of the base 10 will be described later.

Figure 2:
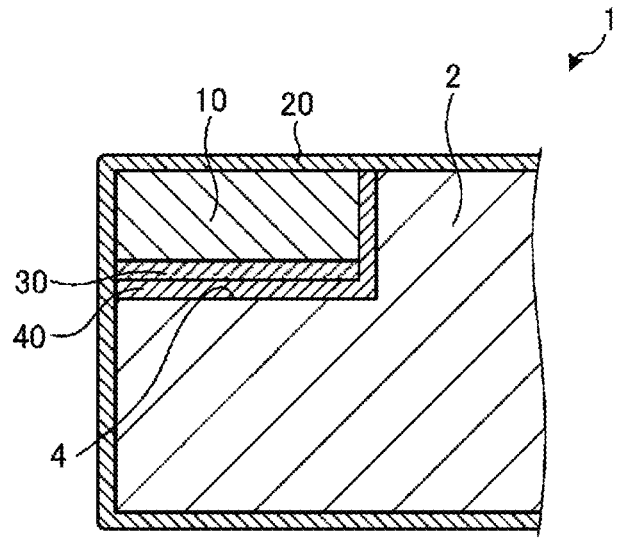
FIG. 2 is a side cross-sectional view illustrating an example of the insert according to the embodiment.

FIG. 2 is a side cross-sectional view illustrating an example of the insert 1 according to the embodiment. A substrate 30 made from, for example, cemented carbide or cermet may be located on the lower surface of the base 10 as illustrated in FIG. 2. In this case, the base 10 is bound to the seat 4 of the body portion 2 via the substrate 30 and a bonding material 40. The bonding material 40 is, for example, a brazing material. In a portion other than the seat

4 of the body portion 2, the base 10 may be bound to the body portion 2 via the bonding material 40.

Note that, in the embodiment, only the base 10 that is a part of the insert 1 is formed by the cBN sintered compact, but the entire insert may be formed by the cBN sintered compact.

The base 10 may be covered by a coating film 20. The coating film 20 is coated on the base body 10 for the purpose of, for example, improving wear resistance, heat resistance, etc. of the base body 10. In the example in FIG. 2, the coating film 20 entirely covers the body portion 2 and the base 10. However, this should not be construed in a limiting sense, and the coating film 20 may be located at least on the base 10. The coating film 20 may be located on the body portion 2. When the coating film 20 is located on the upper surface of the base 10, the first surface 6 (see FIG. 1) has high wear resistance and heat resistance. When the coating film 20 is located on the side surface of the base 10, the second surface 7 (see FIG. 1) has high wear resistance and heat resistance.

The coating film 20 may include a metal layer and a hard layer. The metal layer is located between the base 10 and the hard layer. The metal layer has a higher adhesion to the base 10 than to the hard layer. Examples of metal elements having such characteristics include Zr, V, Cr, W, Al, Si, and Y. The metal layer contains at least one metal element among the above-described metal elements.

The hard layer has excellent wear resistance compared with the metal layer. The hard layer may have one or more metal nitride layers. For example, the hard layer may include a plurality of first metal nitride layers and a plurality of second metal nitride layers, with the first metal nitride layers and the second metal nitride layers alternately stacked. The first metal nitride layer is located on the metal layer.

For example, the metal layer may contain Al and Cr. In this case, the first metal nitride layer may contain Al. Specifically, the first metal nitride layer may be an AlTiN layer containing AlTiN, which is a nitride of Al and Ti. The second metal nitride layer may be an AlCrN layer containing AlCrN, which is a nitride of Al and Cr.

In this way, the first metal nitride layer containing the metal contained in the metal layer is located on the metal layer, and thus the adhesion between the metal layer and the hard layer is high. This makes it difficult for the hard layer to peel off from the metal layer, so the durability of the coating film 20 is high.

The first metal nitride layer, that is, the AlTiN layer is excellent in terms of, for example, wear resistance in addition to adhesion to the metal layer described above. The second metal nitride layer, that is, the AlCrN layer, has excellent heat resistance and oxidation resistance, for example. In this manner, the coating film 20 includes the first metal nitride layer and the second metal nitride layer having different compositions from each other, and thus properties such as wear resistance and heat resistance of the hard layer can be controlled. Accordingly, the tool life of the insert 1 can be extended. For example, in the hard layer according to the embodiment, mechanical properties such as adhesion with the metal layer and wear resistance can be improved while excellent heat resistance of AlCrN is maintained.

Specific Configuration of cBN Sintered Compact

In the cBN sintered compact forming the base 10 according to the embodiment, it suffices if the cBN particles occupy at least 60% or more of the cross-sectional area of the cBN sintered compact. Furthermore, the cBN particles 11 may even occupy 65% or more of the area. The area occupancy of the cBN particles can be determined by analyzing an SEM observation photograph of a cross section of the cBN sintered compact, for example. The part other than the cBN particles in the cBN sintered compact is referred to as a binder phase.

The cBN sintered compact according to the embodiment contains TiN. TiN is contained in the binder phase.

Here, cBN (111) is an X-ray intensity on a (111) plane of the cBN, and TiN (200) is an X-ray intensity on a (200) plane of the TiN, obtained by X-ray diffraction on the cBN sintered compact. In the cBN sintered compact according to the embodiment, TiN (200) is higher than cBN (111).

The cBN sintered compact containing a large amount of TiN features excellent wear resistance. On the other hand, a cBN sintered compact containing a small amount of cBN has low hardness and strength. Therefore, there is a problem in that the fracture resistance is low. The cBN sintered compact according to the embodiment contains a predetermined amount of each of the TiN particles and the cBN particles or more, and thus features excellent balance between the wear resistance and fracture resistance.

The cBN sintered compact according to the embodiment may contain AlN and $Al_2O_3$. AlN and $Al_2O_3$ are contained in the binder phase.

Here, AlN (100) is an X-ray intensity on a (100) plane of the AlN, and $Al_2O_3$ (104) is an X-ray intensity on a (104) plane of the $Al_2O_3$, obtained by X-ray diffraction on the cBN sintered compact. In the cBN sintered compact according to the embodiment, AlN (100) may be higher than $Al_2O_3$ (104).

$Al_2O_3$ and AlN are particles containing Al. $Al_2O_3$ features high oxidation resistance. When the amount of $Al_2O_3$ is large, the strength of the cBN sintered compact may be low. The cBN sintered compact with AlN has high strength. When the amount of AlN is large, the hardness of the cBN sintered compact may be low.

The cBN sintered compact has an excellent balance between the strength and the hardness when AlN (100) is higher than $Al_2O_3$ (104).

The binder phase of the cBN sintered compact may contain 0.5-3.0 atomic % of Al. The cBN sintered compact having such a composition contains a sufficient amount of AlN and $Al_2O_3$ and thus features excellent balance between strength and hardness. The Al content in the cBN sintered compact can be measured by an energy dispersive X-ray microanalyzer (EDS) equipped with a scanning electron microscope (SEM) or a transmission electron microscope (TEM), a wavelength dispersive X-ray microanalyzer (WDS), inductively coupled plasma emission spectroscopy (ICP), and secondary ion mass spectrometry (SIMS).

The cBN sintered compact according to the embodiment may contain $TiB_2$. $TiB_2$ is contained in the binder phase.

Here, the X-ray intensity of a $TiB_2$ (101) plane is referred to as $TiB_2$ (101). In the cBN sintered compact according to the embodiment, $TiB_2$ (101) may be ¼ of cBN (111) or higher.

With the $TiB_2$ content set to be within a range satisfying the above condition, the bonding force between the binder phase and the cBN particles is improved. Thus, the cBN sintered compact according to the embodiment features excellent hardness and strength.

Cutting Tool

Figure 3:
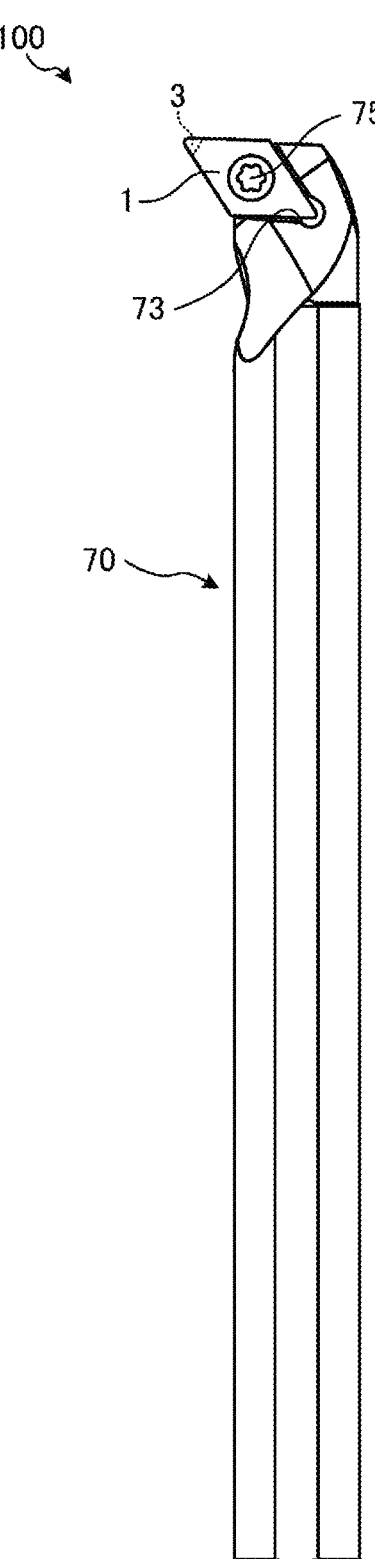
FIG. 3 is a front view illustrating an example of a cutting tool according to the embodiment.

Next, a configuration of a cutting tool including the above-described insert 1 will be described with reference to FIG. 3. FIG. 3 is a front view illustrating an example of a cutting tool according to the embodiment.

As illustrated in FIG. 3, a cutting tool 100 according to the embodiment includes the insert 1 and a holder 70 for fixing the insert 1.

The holder 70 is a rod-shaped member that extends from a first end (an upper end in FIG. 3) toward a second end (a lower end in FIG. 3). The holder 70 is made of, for example, steel or cast iron. In particular, it is preferable to use steel having high toughness among these members.

The holder 70 has a pocket 73 at an end portion on the first end side. The pocket 73 is a portion in which the insert 1 is mounted, and has a seating surface intersecting with the rotation direction of the workpiece and a binding side surface inclined with respect to the seating surface. A screw hole into which a screw 75 described later is screwed is provided on the seating surface.

The insert 1 is located in the pocket 73 of the holder 70, and is mounted on the holder 70 by the screw 75. That is, the screw 75 is inserted into the through hole 5 of the insert 1, and the tip end of the screw 75 is inserted into the screw hole formed in the seating surface of the pocket 73, and the screw portions are screwed together. Thus, the insert 1 is mounted on the holder 70 such that the cutting edge 8 (see FIG. 1) protrudes outward from the holder 70.

In the embodiment, a cutting tool used for so-called turning processing is exemplified. Examples of the turning processing include boring, external turning, and groove-forming. Note that, a cutting tool is not limited to those used in the turning processing. For example, the insert 1 may be used as a cutting tool used for milling processing.

Next, an example of a manufacturing method of the insert 1 according to the embodiment will be described. Note that the manufacturing method of the insert 1 is not limited to the method described below.

First of all, 72 to 82 vol % of TiN raw powder, 13 to 23 vol % of Al raw powder, and 1 to 11 vol % of $Al_2O_3$ raw powder are prepared. Then, an organic solvent is added to each raw powder prepared. As the organic solvent, alcohols such as acetone and isopropyl alcohol (IPA) may be used. Then, the resultant mixture is milled and mixed for 20 to 24 hours in a ball mill. After the milling and mixing, the solvent is evaporated, whereby first mixture powder is produced.

Next, cBN powder having an average particle diameter of 2.5 to 4.5 µm and cBN powder having an average particle diameter of 0.5 to 1.5 µm are mixed with a volume ratio of 8:2 to 9:1. An organic solvent is further added. As the organic solvent, alcohols such as acetone and IPA may be used. Then, the resultant mixture is milled and mixed for 20 to 24 hours in a ball mill. After the milling and mixing, the solvent is evaporated, whereby second mixture powder is produced.

The resulting first mixture powder and second mixture powder are mixed in a volume ratio of 68%:32% to 78%:22%. Organic solvent and organic binder are added to the mixture powder. As the organic solvent, alcohols such as acetone and IPA may be used. As the organic binder paraffin, acrylic resin, or the like may be used. The mixture is milled and mixed in the ball mill for 20 to 24 hours, and then the organic solvent is evaporated, whereby third mixture powder is produced. Note that a dispersant can be added as necessary in the step using the ball mill.

The third mixture powder is molded into a molded object of a predetermined shape. A known method such as uniaxial pressing or cold isostatic pressing (CIP) may be used for the molding. The molded object is heated at a predetermined temperature in a range from 500 to 1000° C., whereby the organic binder is evaporated and removed.

Next, the molded object is put to an ultra-high pressure heating device, to be heated at 1200 to 1500° C. for 15 to 30 minutes under a pressure of 4 to 6 GPa. As a result, the cBN sintered compact according to the embodiment is yielded.

EXAMPLES

Hereinafter, examples of the present disclosure will be described; however, the present disclosure is not limited to the following examples.

First of all, TiN raw powder, Al raw powder, and $Al_2O_3$ raw powder were prepared. These kinds of prepared raw powder and a solvent that is acetone were mixed at a predetermined ratio, and then the solvent was evaporated. As a result, the first mixture powder was produced. These kinds of raw powder were mixed using a ball mill. The pulverizing and mixing time using the ball mill was 20 to 24 hours.

Next, the cBN powder having an average particle diameter of 3.5 µm and the cBN powder having an average particle diameter of 1.0 µm were mixed at a volume ratio of 9:1, and then a solvent, which is acetone, was further added as a solvent. The resultant mixture was dried and the second mixture powder was produced. Then, the produced first mixture powder and the second mixture powder as well as a solvent, which is acetone, and an organic binder were pulverized and mixed in a ball mill for 20 to 24 hours. Thereafter, the solvent was evaporated, whereby the third mixture powder was produced. Then, the third mixture powder was molded into a molded object of a predetermined shape. The molded object was heated at a predetermined temperature in a range from 500 to 1000° C. for degreasing. Note that a dispersant is added in the step using the ball mill.

Next, the molded object was put in an ultra-high pressure heating device, to be heated at 1300° C. for 15 minutes under a pressure of 4.5 GPa. As a result, the cBN sintered compact according to each of the examples was yielded.

The manufacturing method will be described more in detail below. The first mixture powder was prepared by mixing the TiN raw powder, the Al raw powder, and $Al_2O_3$ in a volume ratio of 77%:18%:6%. Then, the first mixture powder thus prepared and the second mixture powder were mixed in a volume ratio of 73:27, to yield a cBN sintered compact. This sample is referred to as "Sample No. 1".

The first mixture powder was prepared by mixing the TiN raw powder, the Al raw powder, and $Al_2O_3$ in a volume ratio of 76%:13%:11%. Then, the first mixture powder and the second mixture powder were mixed in a volume ratio of 73:27, to yield a cBN sintered compact. This sample is referred to as "Sample No. 2". Sample No. 1 and Sample No. 2 correspond to the examples of the cBN sintered compact according to the present disclosure.

In the following, a commercially available cBN sintered compact is referred to as "Sample No. 3". A comparative product is referred to as "Sample No. 4". Sample No. 3 and Sample No. 4 correspond to the comparative examples for the cBN sintered compact according to the present disclosure. Sample No. 1 and Sample No. 2 are different from the comparative products in raw material. Specifically, for Sample No. 1 and Sample No. 2, the metal Al powder was used as raw powder, whereas AlN powder was used for the comparative product.

Each of Samples No. 1 to No. 4 was pulverized and then measured using an X-ray diffractometer (XRD), and with the obtained 2θ (2θ is the diffraction angle), identification was performed using a JCPDS card. The numbers of the JCPDS cards used for cBN, TiN, TiB2, AlN, and $Al_2O_3$ respectively were 01-077-8873, 01-087-0632, 01-085-2083, 00-025-1133, and 01-075-0784. The results are illustrated in FIG. 4. FIG. 4 is a table illustrating a result of expressing the peak intensity height obtained by XRD measurement using the number of counts of a scintillation counter per second. In FIG. 4, "AlN/$Al_2O_3$(%)" is a value obtained by dividing AlN (100) by $Al_2O_3$ (104) and multiplying the resultant value by 100, and "$TiB_2$/cBN (%)" is a value obtained by dividing $TiB_2$ (101) by cBN (111) and multiplying the resultant value by 100.

Figure 5:
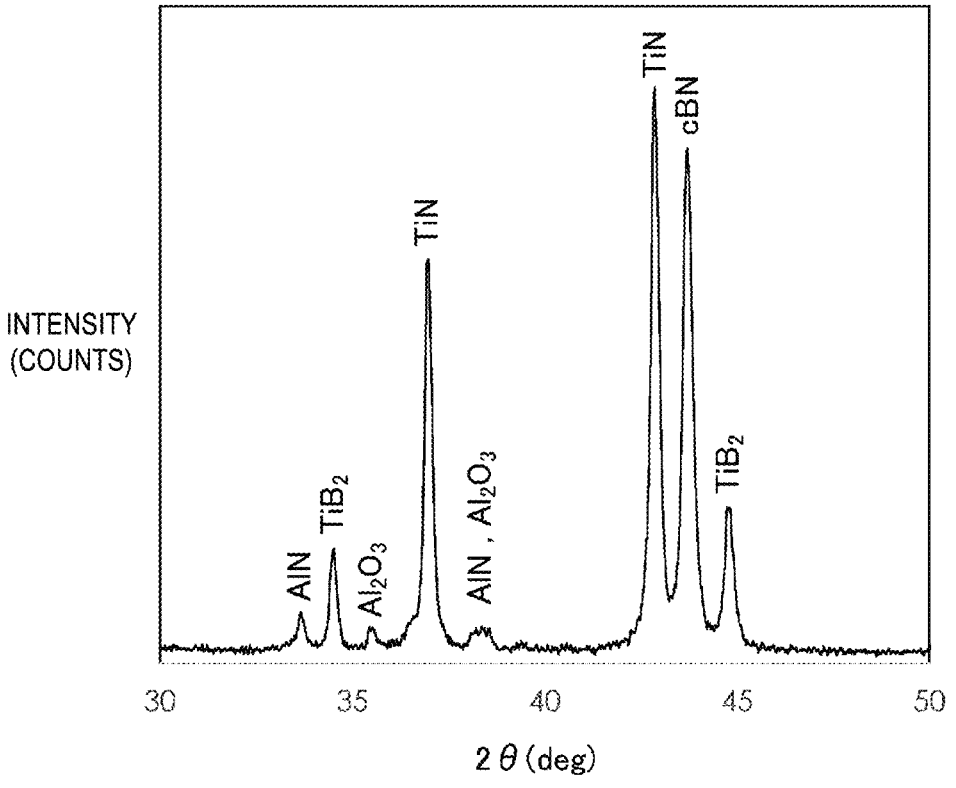
FIG. 5 is a graph illustrating a result of XRD measurement on Sample. No. 1.
Figure 6:
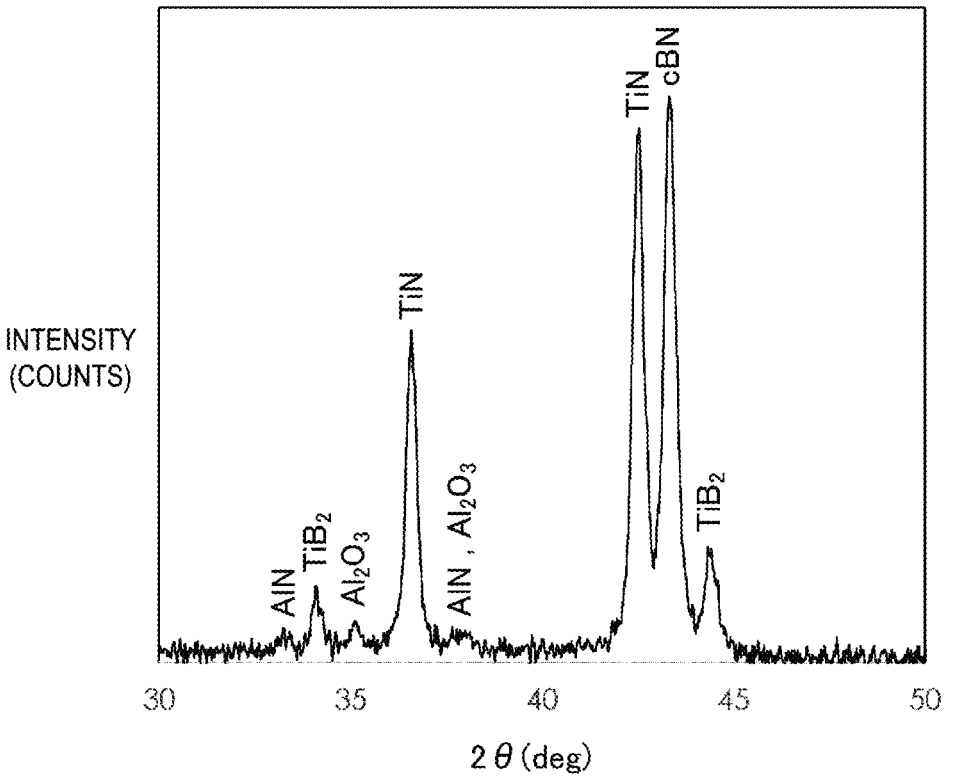
FIG. 6 is a graph illustrating a result of XRD measurement on Sample. No. 3.

FIG. 5 is a graph illustrating a result of XRD measurement on Sample No. 1. FIG. 6 is a graph illustrating a result of XRD measurement on Sample No. 3.

As illustrated in FIG. 4, in Sample No. 1 and Sample No. 2, which are the examples, TiN (200) is higher than cBN (111). On the other hand, in Sample No. 3 and Sample No. 4, which are the comparative examples, TiN (200) is lower than cBN (111).

In Sample No. 1, which is one of the examples, AlN (100) is higher than $Al_2O_3$ (104). Specifically, in Sample No. 1, AlN (100) is 1.41 times as high as $Al_2O_3$ (104). On the other hand, in Sample No. 3, which is one of the comparative examples, AlN (100) is lower than $Al_2O_3$ (104).

Also, Sample No. 1 has $TiB_2$ (101) being 0.303 times as high as cBN (111), and Sample No. 2 has $TiB_2$ (101) being 0.302 times as high as cBN (111). Thus, in Sample No. 1 and Sample No. 2, which are the examples, $TiB_2$ (101) is ¼ of cBN (111) or more. In this context, Sample No. 3 has $TiB_2$ (101) being 0.203 times as high as cBN (111), and Sample No. 4 has $TiB_2$ (101) being 0.134 times as high as cBN (111). Thus, in Sample No. 3 and Sample No. 4, which are the comparative examples, $TiB_2$ (101) is less than ¼ of cBN (111).

Next, the cutting test was performed using each of the samples, and wear resistance, stability, and fracture resistance were evaluated under the following cutting conditions. The results are shown in FIG. 7. FIG. 7 is a table showing the results of evaluating wear resistance and stability for each sample.

Cutting Condition

Wear Resistance Evaluation Test

Cutting method: turning/external turning
Workpiece: SCM415 (carburized hardening material)
Cutting Speed: 150 m/min
Feed: 0.1 mm/rev
Depth of Cut: 0.2 mm
Evaluated by: time required for reaching the wear amount
of 0.15 mm, or time when the evaluation was determined to be stopped from a cutting edge state Stability Evaluation Test Cutting method: turning/end face processing
Workpiece: SCM415 (carburized) 8 holes ($\varphi$10)
Cutting Speed: 150 m/min
Feed: 0.2 mm/rev
Depth of Cut: 0.2 mm
Evaluated by: the number of impacts of causing defect on cutting edge As shown in FIG. 7, both wear resistance and stability of Sample No. 1, which is one of the examples, were higher than those of Sample No. 3 and Sample No. 4, which are the comparative examples. The wear resistance and the stability of Sample No. 1 were higher than that of Sample No. 2, which is one of the examples. Both wear resistance and stability of Sample No. 2, which is one of the examples, were higher than those of Sample No. 4, which is one of the comparative examples. Both wear resistance and stability of Sample No. 2, which is one of the examples, were higher than those of Sample No. 3, which is one of the comparative examples.

As described above, the cBN sintered compact according to each of the examples contains the Al compound particles with inferior mechanical properties, but the size of the Al compound particles are controlled to be within an appropriate range, and thus features excellent mechanical properties with small variations.

As described above, the insert according to embodiments (the insert 1, for example) includes the cBN sintered compact in which a plurality of cBN particles (the cBN particles 11, for example) is bound via the binder phase (the binder phase 12, for example). The plurality of cBN particles occupies 60% or more of the cross-sectional area of the cBN sintered compact. The binder phase contains Al compound particles containing at least one of AlN or $Al_2O_3$. A particle distribution of the Al compound particles in a cross section of the cBN sintered compact that is a cumulative distribution based on the number of Al compound particles is as follows. Specifically, the proportion of the Al compound particles with the particle diameter of 0.3 μm or larger is 5% or more, and the proportion of the Al compound particles with the particle diameter of 0.5 μm or larger is less than 5%.

A particle distribution of the Al compound particles in a cross section of the cBN sintered compact that is a cumulative distribution based on the number of Al compound particles is as follows. Specifically, the proportion of the Al compound particles with the particle diameter of 0.3 μm or larger is 7% or more, and the proportion of the Al compound particles with the particle diameter of 0.5 μm or larger is less than 2%.

As described above, the insert according to the embodiment (insert 1 as an example) includes a cBN sintered compact containing cBN and TiN, with cBN occupying 60% or more of an area of a cross section of the cBN sintered compact observed. TiN (200) is higher than cBN (111), where the TiN (200) is an X-ray intensity on a (200) plane of the TiN and the cBN (111) is an X-ray intensity on a (111) plane of the cBN, obtained by X-ray diffraction on the cBN sintered compact.

As described above, the cBN sintered compact according to each of the examples contains a certain amount of each of TiN and cBN or more, and thus features excellent balance between the wear resistance and fracture resistance.

The insert according to the embodiment may include the coating film (the coating film 20, for example) located on the cBN sintered compact. With the coating film, the wear resistance and heat resistance can be further improved.

In the embodiment described above, the shape of the upper surface and the lower surface of the cutting tool 100 is a parallelogram as an example, but the shape of the upper surface and the lower surface of the cutting tool 100 may be diamond, square, or the like. Additionally, the shape of the upper surface and the lower surface of the cutting tool 100 may be triangular, pentagonal, hexagonal, etc.

The shape of the cutting tool 100 may be of a positive type or negative type. The positive type is a type in which the side surface is inclined with respect to the central axis passing through the center of the upper surface and the center of the lower surface of the cutting tool 100, and the negative type is a type in which the side surface is parallel to the central axis described above.

Further effects and variations can be readily derived by those skilled in the art. Thus, a wide variety of aspects of the present invention are not limited to the specific details and representative embodiments represented and described above. Accordingly, various changes are possible without departing from the spirit or scope of the general inventive concepts defined by the appended claims and their equivalents.

REFERENCE SIGNS

1 Insert
2 Body portion
4 Seat
5 Through hole
6 First surface
7 Second surface
8 Cutting edge
10 Base
20 Coating film
30 Substrate
40 Bonding material
70 Holder
73 Pocket
75 Screw
100 Cutting tool

The invention claimed is:

1. An insert, comprising a cBN sintered compact containing cBN and TiN, wherein
the cBN occupies 60% or more of a cross-sectional area of the cBN sintered compact observed, and
TiN (200) is higher than cBN (111), where the TIN (200) is an X-ray intensity on a (200) plane of the TiN and the cBN (111) is an X-ray intensity on a (111) plane of the cBN, obtained by X-ray diffraction on the cBN sintered compact, wherein
the cBN sintered compact comprises a binder phase, and the binder phase contains 0.5-3.0 atomic % of Al.

2. The insert according to claim 1, wherein
the cBN sintered compact further contains AlN and $Al_2O_3$, and AlN (100) is higher than $Al_2O_3$ (104), where the AlN (100) is an X-ray intensity on a (100) plane of the AlN and the $Al_2O_3$ (104) is an X-ray intensity on a (104) plane of the $Al_2O_3$, obtained by X-ray diffraction on the cBN sintered compact.

3. The insert according to claim 1, wherein
the cBN sintered compact further contains $TiB_2$, and
$TiB_2$ (101) is ¼ of the cBN (111) or higher, where the $TiB_2$ (101) is an X-ray intensity on a (101) plane of the $TiB_2$.

4. The insert according to claim 1, further comprising a coating film located on the cBN sintered compact.

5. A cutting tool, comprising:
a holder having a rod-shape and comprising a pocket at an end portion of the rod-shaped holder; and
an insert located in the pocket, the insert comprising a cBN sintered compact containing cBN and TiN, wherein
the cBN occupies 60% or more of a cross-sectional area of the cBN sintered compact observed, and
TiN (200) is higher than cBN (111), where the TiN (200) is an X-ray intensity on a (200) plane of the TiN and the cBN (111) is an X-ray intensity on a (111) plane of the cBN, obtained by X-ray diffraction on the cBN sintered compact,
the cBN sintered compact comprises a binder phase, and
the binder phase contains 0.5-3.0 atomic % of Al.

6. The cutting tool according to claim 5, wherein
the cBN sintered compact further contains AlN and $Al_2O_3$, and
AlN (100) is higher than $Al_2O_3$ (104), where the AlN (100) is an X-ray intensity on a (100) plane of the AlN and the $Al_2O_3$ (104) is an X-ray intensity on a (104) plane of the $Al_2O_3$, obtained by X-ray diffraction on the cBN sintered compact.

7. The cutting tool according to claim 5, wherein
the cBN sintered compact further contains $TiB_2$, and
$TiB_2$ (101) is ¼ of the cBN (111) or higher, where the $TiB_2$ (101) is an X-ray intensity on a (101) plane of the $TiB_2$.

8. The cutting tool according to claim 5, further comprising a coating film located on the cBN sintered compact.

\* \* \* \* \*